L. F. HAAS.
Harrow.
No. 199,287.  Patented Jan. 15, 1878.
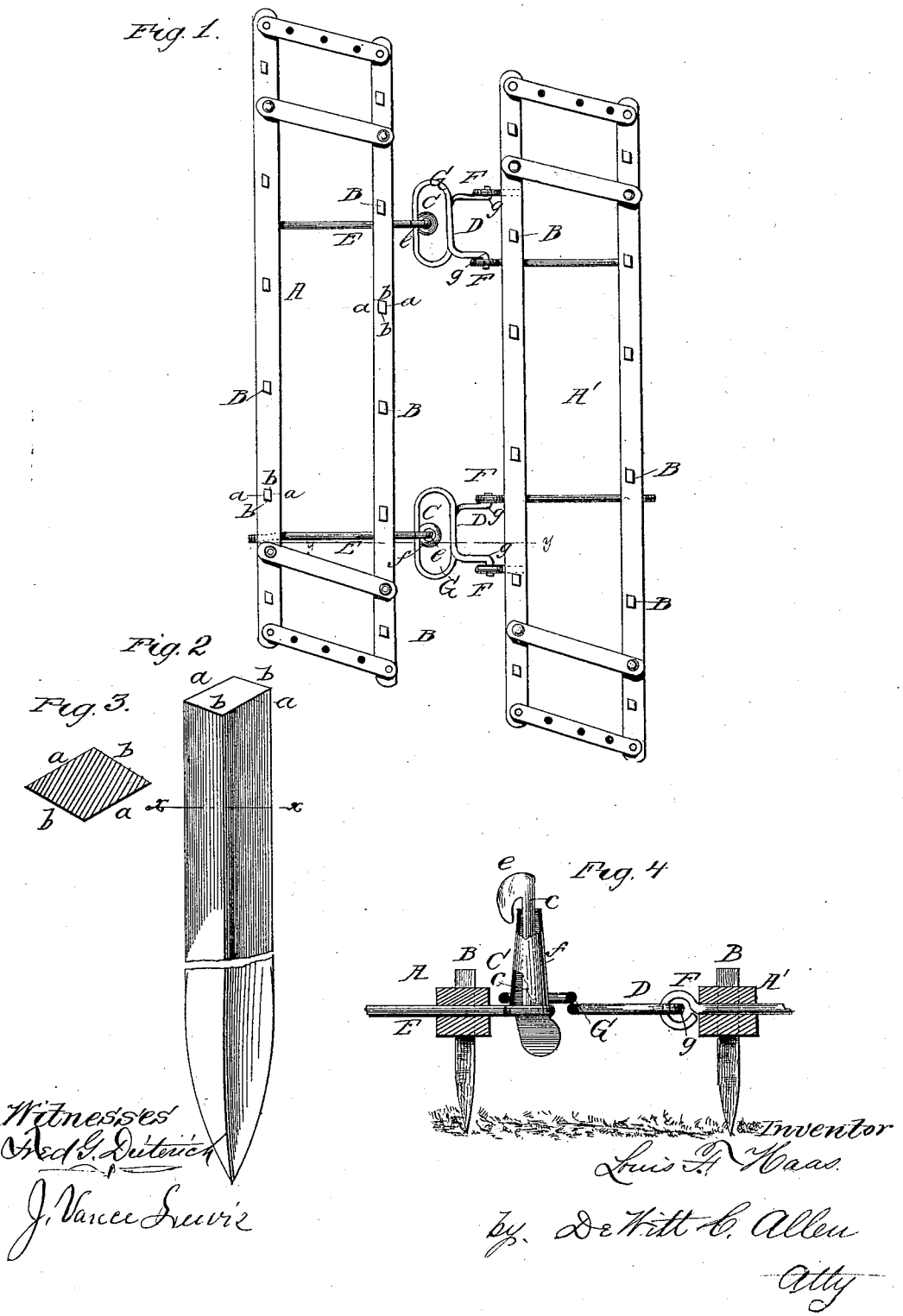

UNITED STATES PATENT OFFICE.

LOUIS F. HAAS, OF FOND DU LAC, WISCONSIN.

IMPROVEMENT IN HARROWS.

Specification forming part of Letters Patent No. 199,287, dated January 15, 1878; application filed December 24, 1877.

*To all whom it may concern:*

Be it known that I, LOUIS F. HAAS, of Fond du Lac, in the county of Fond du Lac and State of Wisconsin, have invented certain new and useful Improvements in Harrows; and I do hereby declare that the following is a full, clear, and exact description of the same, reference being made to the accompanying drawing, forming a part of this specification, and in which—

Figure 1 is a perspective view of a harrow with my improvements attached; Fig. 2, an enlarged perspective view of one of the teeth; Fig. 3, a cross-section of Fig. 2; Fig. 4, detail view of the hinge or coupling for the harrow.

This invention relates to improvements in the construction of the teeth and the hinge or coupling for harrows; and the invention consists in constructing the teeth in rhomboidal shape in their cross-section, so that they will set straight in the timbers, and still have their cutting-edge in the line of the draft; and also consists in the construction of the hinge or coupling, whereby either section of the harrow can vibrate freely, and work up and down without interfering with the other section, or producing much wear or friction on the hinge or coupling, all as hereinafter fully described.

In the drawing, A and A' represent the two sections of a harrow, connected together by my improved hinge or coupling. B B represent the teeth of the harrow. Each tooth is so constructed that the two opposite sides $a\ a$ are longer in width than the two adjacent sides $b\ b$, or the tooth in cross-section is rhomboidal in shape, as clearly shown in Fig. 3. The teeth are secured in the beams or timbers so that the sides $a\ a$ are on a straight line with the length of the beams or timbers, but the cutting-edges of the teeth in the line of the draft, which is diagonally across the sections, as clearly shown in Fig. 1.

By the above-described construction of tooth I am enabled to set or secure it straight in the beams or timbers, and at the same time present the cutting-edge in the line of the draft of the harrow, so that when at work the teeth come in contact with the ground only on one side or edge, or present only one cutting edge or side to the ground, which makes the harrow work much easier than if both sides or edges of the teeth were presented to the ground. The teeth are, however, intended to cut from either front or back edge, the construction of the harrow admitting of its being reversed when the teeth become dull on their front sides.

C D represent the sections of the hinge or coupling for connecting the sections A A' of the harrow. Each of the sections C is composed of a bolt, E, passing transversely through the beams of section A, and is provided at one end with a vertical rod, $c$, provided with a downwardly-projecting hook, $e$. The vertical rod $c$ is also provided with a friction spool or roller, $f$. Each of the sections D is composed of two eyebolts, F F, passing transversely through the beams of the section A', and in the eyes of said bolts the ends $g\ g$ of the oblong loop G fit, thus forming a hinged or pivoted loop, which, in the present instance, is formed from a single rod, bent as shown in Fig. 4. The loops G fit over the hooked rods of the sections C.

The above-described construction of coupling allows either section of the harrow to vibrate freely, and work up and down without producing much friction or wear upon the coupling, on account of the hinged or pivoted loops always coming in contact with the friction spools or rollers on the hooked rods, thus greatly increasing the durability of the coupling. The hinged or pivoted loops, fitting loosely over the hooked rods, allow of the sections rising and falling in passing over uneven ground without uncoupling by the loops coming in contact with the barbs of the hooked rods. This coupling also prevents the sections of the harrow coming together or riding each other, as the loops and hooked rods, in coming together as said sections rise and fall, will prevent the sections from coming any nearer together. The sections of the harrow can also be provided with the perforated bars on their front and rear ends, and to which the draft-chains can be secured, thus allowing the harrow to be reversed when the front edges of the teeth become dull.

I claim as my invention—

1. The herein-described tooth for harrows, constructed in rhomboidal form in cross-section, whereby it can be set straight in the beams or timbers of the harrow, and present but one side or cutting-edge to the ground and in the line of the draft, substantially as specified.

2. The combination, with the sections A A' of a harrow, of the hooked rods $c\ e$ and hinged or pivoted loops G, substantially as and for the purpose herein shown and described.

3. The combination, with the loops G of the section A' of the harrow, of the section A, having the hooked rods $c\ e$, provided with the friction spools or rollers $f$, substantially as and for the purpose specified.

4. The combination, with the sections A A' of a harrow, of the coupling-sections C D, consisting of the bolts E, vertical hooked rods $c\ e$, friction spools or rollers $f$, eyebolts F F, and pivoted or hinged loops G $g\ g$, the several parts constructed and relatively arranged to operate as herein shown and described.

LOUIS F. HAAS.

Witnesses:
JOHN B. BUSHNELL,
L. GOLDSTUCKER.